Sept. 4, 1928. S. A. GIBSON 1,682,782
MOTOR VEHICLE
Filed Nov. 21, 1927 3 Sheets-Sheet 1

Inventor
S. A. Gibson
By Clarence A. O'Brien
Attorney

Sept. 4, 1928.

S. A. GIBSON 1,682,782

MOTOR VEHICLE

Filed Nov. 21, 1927

3 Sheets-Sheet 3

Inventor

S. A. Gibson

By Clarence A. O'Brien
Attorney

Patented Sept. 4, 1928.

1,682,782

UNITED STATES PATENT OFFICE.

STEPHEN A. GIBSON, OF HEREFORD, ARIZONA.

MOTOR VEHICLE.

Application filed November 21, 1927. Serial No. 234,835.

The present invention relates to motor vehicles and has for a principal object to provide front and rear wheel trucks upon which the body of the vehicle is mounted, the front truck of the vehicle being operatively connected with the steering mechanism for turning as a unit whereby to effect the simultaneous turning of the front wheels and thereby enable the steering of the vehicle through the front wheels thereof.

Another object is to mount each vehicle wheel within a frame constituting a guard for the wheel whereby to protect the wheel against injury from any object with which the same may come into contact, said frame also providing a support for the axle at each side of the wheel thus adding to the strength of the wheel mounting.

A further object of the invention is to yieldably mount the vehicle wheels at each side of the truck whereby to prevent the transmission of road shocks encountered by the wheel to the body of the vehicle.

A still further object is to provide novel means for attaching the vehicle springs to the wheel truck in a manner permitting the free flexing action of the springs and thus improve the riding qualities and comfort of the car.

Another object is to provide a vehicle of this character of simple and practical construction, strong and durable and adapted particularly for use in connection with trucks or similar vehicles upon which heavy loads are carried, which is relatively inexpensive to manufacture and permit of an easy replacement of the parts for repair and otherwise well adapted for the purposes for which the same is intended.

Figure 1:
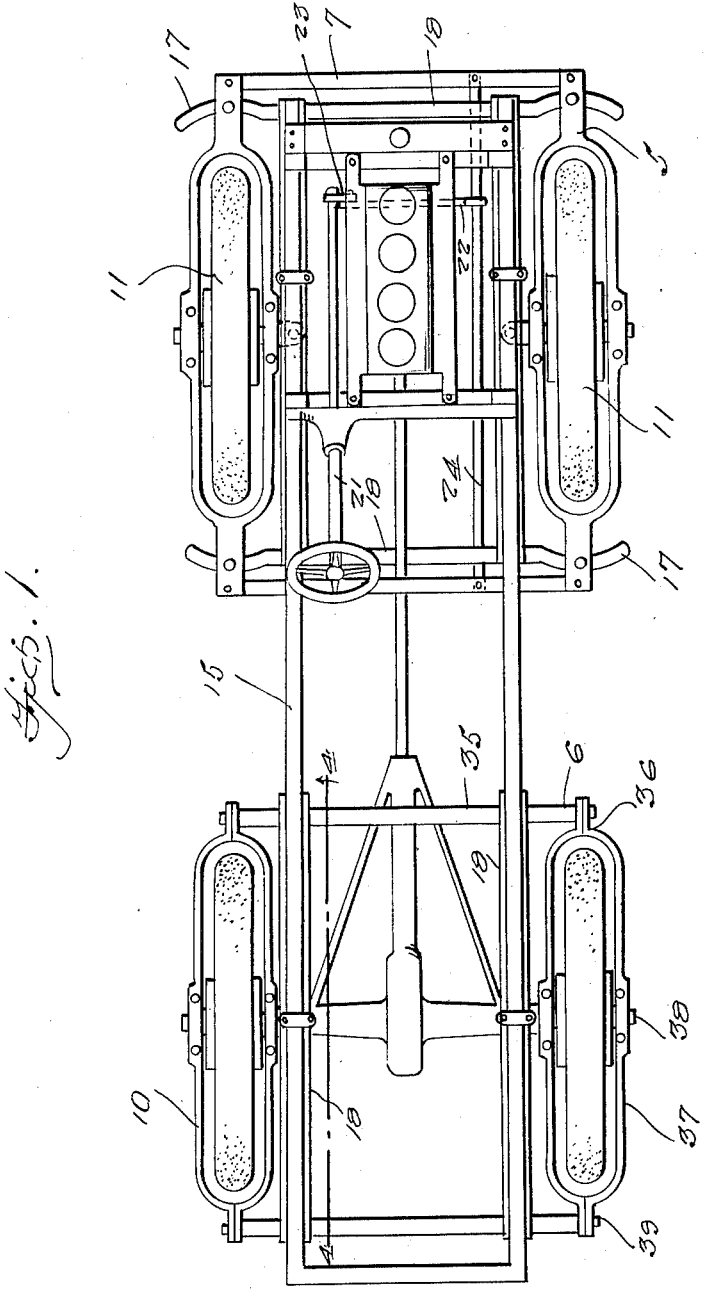
Figure 2:
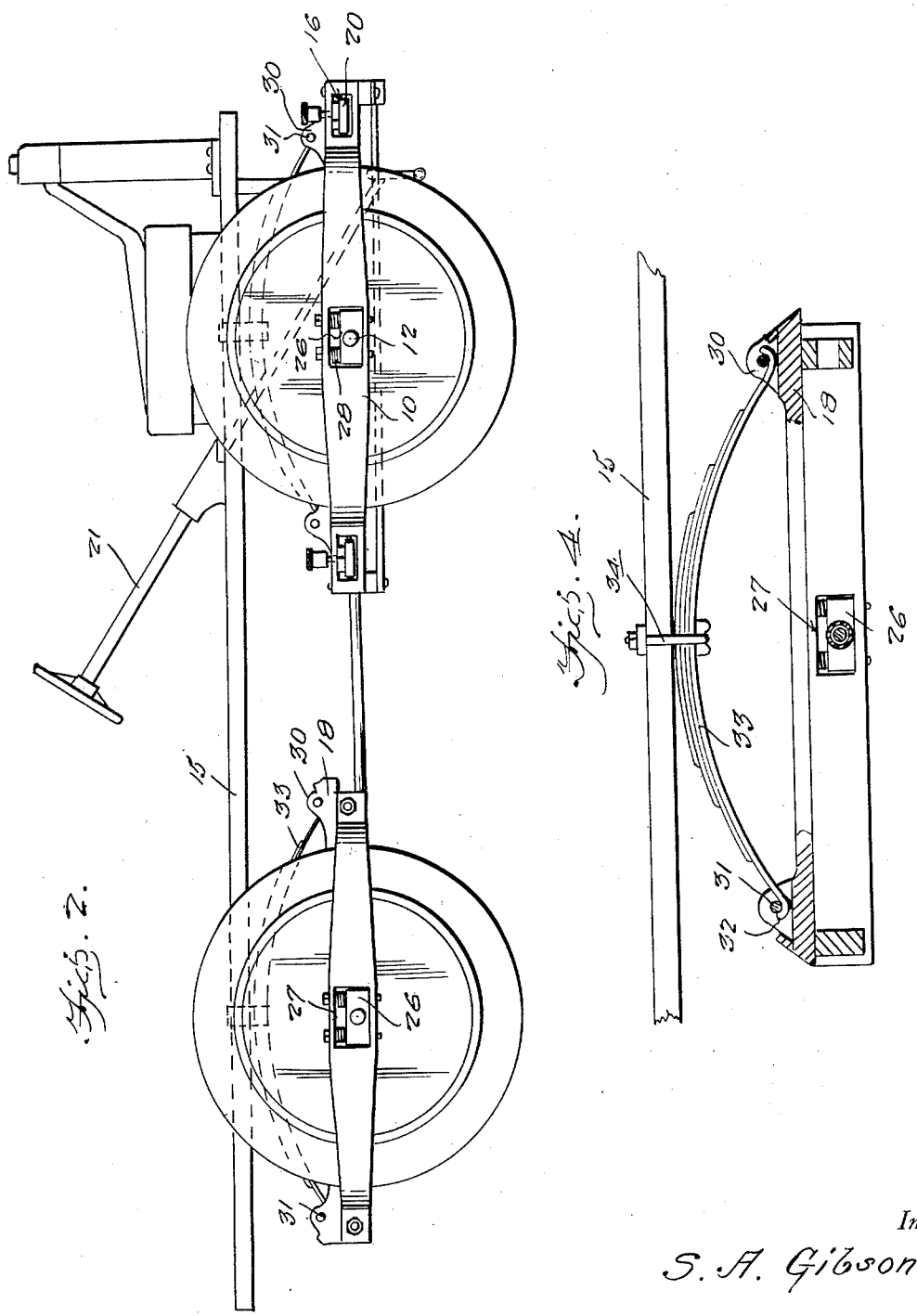
Figure 3:
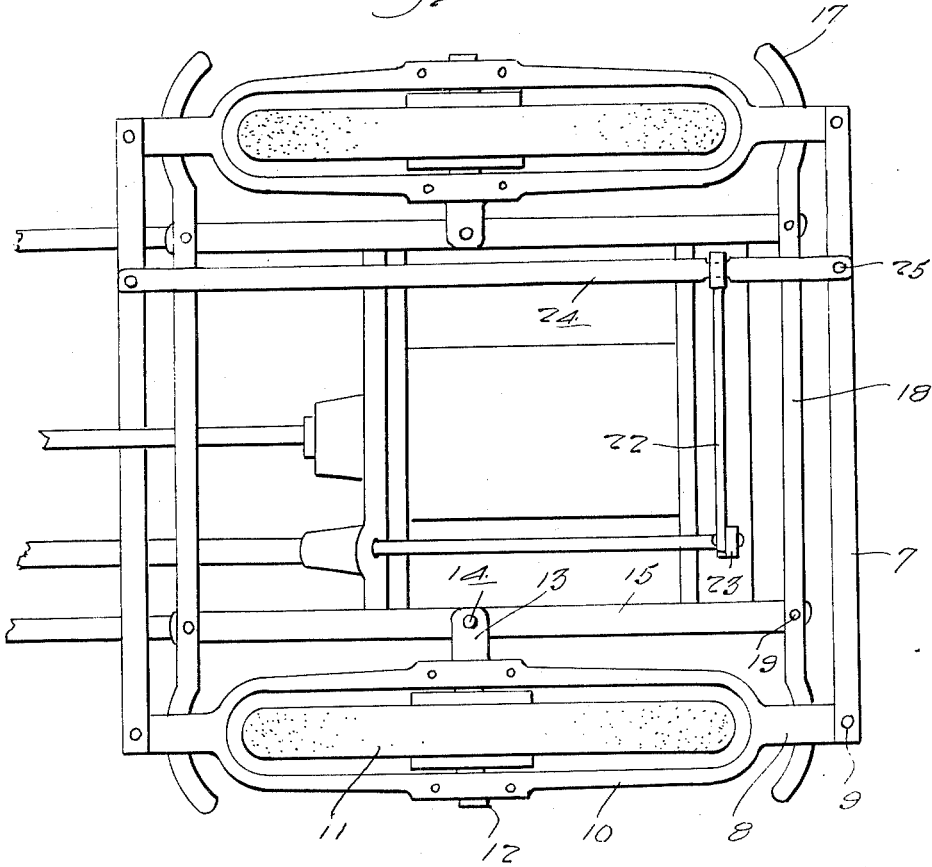
Figure 5:
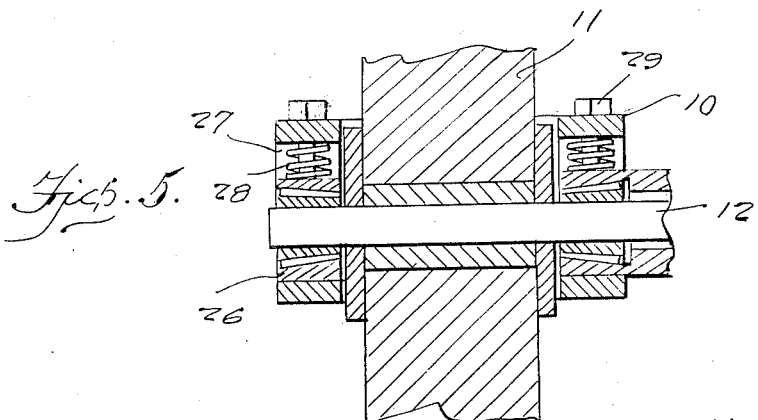

Other objects and advantages reside in the special construction and combination of the various elements comprising the invention, reference being had to the accompanying drawings forming a part hereof, wherein:

Figure 1 is a top plan view of a vehicle chassis showing my invention in position thereof, Figure 2 is a side elevational view, Figure 3 is a bottom plan view of the front wheels of the truck, Figure 4 is a longitudinal sectional view through the rear of the truck taken substantially along a line 4—4 of Figure 1, and Figure 5 is a fragmentary transverse sectional view through the hub of one of the wheels showing the manner in which the same is yieldably mounted on the truck.

Referring now to the drawings in detail, I have illustrated my invention comprising front and rear vehicle wheel trucks indicated generally at 5 and 6 respectively, each of said trucks comprising front and rear transversely extending frame members 7 to each end of which is secured the end of longitudinal frame members 8. The corners of the front truck frame are pivotally connected by vertically disposed pivot pins 9, permitting a distortion of the frame along a horizontal plane for a purpose as more fully hereinafter explained, whereas the ends of the frame members of the rear truck are rigidly connected to each other.

The longitudinal members 8 of the front frame are provided with a section intermediate its ends formed of a pair of spaced parallel frame members 10 having their ends merging with the end of the frame 8 and between which spaced members the wheel 11 of the vehicle is adapted to be journaled for rotation upon axles 12 extending transversely through said spaced members. An inwardly extending bracket 13 is attached to the inner spaced member 10 through which a vertically extending pivot pin 14 is inserted providing a pivotal attachment for the bracket through the longitudinally extending chassis frame 15 of the vehicle. In this manner each of the front wheels 11 of the vehicle are pivotally attached to the frame for horizontal swinging movement.

At each end of the longitudinal frame member 8 of the front truck is arranged a horizontally extending slotted opening 16 through which the arcuate ends 17 of a transversely disposed rod 18 extends, said rod being fixedly attached to the chassis frame by means of bolts 19 or the like. Within the slotted opening 16 at each end of the frame member 8 is rotatably mounted a roller 20 having its axis of rotation disposed longitudinally with respect to the frame member 8. The roller 20 is adapted to support the end 17 of the rod 18 with the upper surface of the end of the rod bearing against the upper edge of the opening 16. The ends of the rod 17 disposed at each end of the longitudinal truck members 8 thus form a rigid support to prevent vertical tilting movement of each end of the truck and at the same time permit transverse or horizontal swinging movement thereof.

The steering post 21 of the vehicle has its lower end connected to a transversely disposed link 22 by means of a lever 23 adapted to transmit the rotary movement of the steering post into a transverse reciprocating movement of the link 22. One end of the link 22 is attached adjacent the forward end of the longitudinally extending rod 24 having its opposite end pivotally attached as at 25 to the front and rear truck.

By reason of this steering connection with the truck of the vehicle the forward end of the truck will accordingly be moved in a direction corresponding with the movement of the link 22 whereas the rear end of the truck will be simultaneously moved in an opposite direction with respect thereto.

Each end of the axle 12 is journaled for rotation through a block 26 disposed within an opening 27 formed in each of the spaced members 10, said block being formed considerably smaller than the opening 26 within which the same is fitted, the block being retained in the lower portion of the opening by means of a pair of coil springs 28 mounted on top of the block and tensionally retained against the upper edge of the opening. Vertically extending bolts 29 are inserted through the member 10 and the block, with the springs 28 mounted thereon whereby to retain the parts in assembled position.

Upon the upper surface of the transverse rod 18 are arranged supports 30 having horizontal transversely disposed pins 31 carried thereby and disposed in slightly spaced relation with respect to the upper surface of the rod 18 sufficiently to admit the insertion therebetween of the hooked end 32 of a semi-elliptical spring 33 attached to the longitudinal chassis frame member 15 by U bolts 34 and extended longitudinally under said chassis frame. As will be seen from an inspection of Figure 4 of the drawing, the underside of the end of the spring is supported upon the transverse rod 18 whereas the upper surface of the spring is retained in position thereon by the pins 31 engaging the hook end thereof.

The rear vehicle truck indicated generally at 6 is constructed substantially similar to that of the front truck 5, except that the transverse frame members 35 of the rear truck are rigidly connected to the opposite end of the longitudinally extending truck members 36. Furthermore the longitudinally extending truck members 36 are formed in section having intermediate portions 37 adapted for disposal about opposite sides of the wheels, said intermediate section forming the support for the rear axle 38 upon which the rear wheel is mounted, said rear axle being yieldably supported within said frame members in a similar manner as that heretofore described with respect to the front axle. As will be observed from an inspection of Figure 1 of the drawings, the ends of each section of the longitudinal truck members 37 are retained in attached position with respect to the transverse front member 35 by means of bolts 39, permitting the outer section of the longitudinal truck member to be removed from its attached position in order to enable the removal of the rear wheel without necessitating a disassembling of the other section of the longitudinal truck member.

By reason of this method of mounting the wheels upon the truck frame it will be apparent that any shock transmitted to the wheel by reason of the encountering thereof with any road irregularities, that the springs 28 interposed between the axles of the wheels and the members of the truck frame will serve to dissipate such shock before the transmittal thereof to the body of the vehicle.

The truck frame structure herein proposed also serves to provide a stronger mounting for the wheels upon the vehicle.

It is obvious that the invention is susceptible of various changes and modifications, without departing from the spirit or scope of the invention or sacrificing any of its advantages, and I accordingly claim all such forms of the device to which I am entitled.

Having thus described my invention, what I claim as new is:

1. In a vehicle of the class described comprising front and rear wheel trucks, each truck including transversely and longitudinally disposed truck members, each of said longitudinal members extending at each side of the adjacent vehicle wheel and providing a mounting for the axle of the wheel, and yieldable means interposed between the axles and their associated truck members.

2. In a vehicle wheel truck, a truck frame comprising front and rear transverse frame members, longitudinally disposed frame members connected thereto, said longitudinal members being composed of a pair of spaced parallel members having alined openings formed therein and adapted to permit the insertion of the axle of the wheel therethrough, a bearing block for the axle arranged within each opening, yieldable means interposed between the block and the frame member and vehicle spring supports carried by said transverse truck member.

3. In combination with a vehicle, of a pair of wheel trucks, each truck comprising transverse and longitudinally extending truck members, said longitudinal members having its intermediate section composed of spaced parallel members forming a mounting for the vehicle wheel therebetween, one of said truck frames having its members pivotally connected to each other with the axles carried by the longitudinal members pivotally attached to the chassis frame, means for connecting the transverse truck frame members to the steering mechanism of the vehicle for transverse movement of the ends of the frame and a pair of rods carried by the vehicle chassis and supporting the ends of the truck frame against vertical tilting movement.

In testimony whereof I affix my signature.

STEPHEN A. GIBSON.